(12) United States Patent
Poovendran et al.

(10) Patent No.: US 9,166,793 B2
(45) Date of Patent: Oct. 20, 2015

(54) EFFICIENT AUTHENTICATION FOR MOBILE AND PERVASIVE COMPUTING

(71) Applicant: University of Washington through its Center for Commercialization, Seattle, WA (US)

(72) Inventors: Radha Poovendran, Seattle, WA (US); Basel Alomair, Kirkland, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 13/705,068

(22) Filed: Dec. 4, 2012

(65) Prior Publication Data

US 2013/0145169 A1  Jun. 6, 2013

Related U.S. Application Data

(60) Provisional application No. 61/566,901, filed on Dec. 5, 2011.

(51) Int. Cl.
*H04L 29/00* (2006.01)
*H04L 9/32* (2006.01)
*H04L 9/06* (2006.01)

(52) U.S. Cl.
CPC ............ *H04L 9/3244* (2013.01); *H04L 9/0643* (2013.01); *H04L 9/3242* (2013.01); *H04L 2209/805* (2013.01)

(58) Field of Classification Search
CPC ... H04L 9/3244; H04L 9/3242; H04L 9/0643; H04L 2209/805
USPC .............................................. 713/181; 726/4
See application file for complete search history.

(56) References Cited

U.S. PATENT DOCUMENTS

| | | | |
|---|---|---|---|
| 6,226,742 B1 | 5/2001 | Jakubowski et al. | |
| 7,254,233 B2 | 8/2007 | Hawkes et al. | |
| 7,620,978 B1 | 11/2009 | Reddy et al. | |
| 7,623,656 B2 | 11/2009 | Hawkes et al. | |
| 2009/0279696 A1* | 11/2009 | Ciet et al. | 380/29 |
| 2012/0036357 A1 | 2/2012 | Struik | |

(Continued)

OTHER PUBLICATIONS

Gilgor, Virgil et al., "Fast Encryption and Authentication: XCBC Encryption and XECB Authentication Modes" FSE 2001, LNCS 2355, pp. 92-108.*

(Continued)

*Primary Examiner* — Michael Pyzocha
(74) *Attorney, Agent, or Firm* — Perkins Coie LLP

(57) ABSTRACT

A method and system for authenticating messages is provided. A message authentication system generates an encrypted message by encrypting with a key a combination of a message and a nonce. The message authentication system generates a message authentication code based on a combination of the message and the nonce modulo a divisor. To decrypt and authenticate the message, the message authentication system generates a decrypted message by decrypting with the key the encrypted message and extracts the message and the nonce. The message authentication system then regenerates a message authentication code based on a combination of the extracted message and the extracted nonce modulo the divisor. The message authentication system then determines whether the regenerated message authentication code matches the original message authentication code. If the codes match, then the integrity and authenticity of the message are verified.

27 Claims, 7 Drawing Sheets

(56) References Cited

U.S. PATENT DOCUMENTS

2012/0076293 A1    3/2012  Smith et al.
2012/0096274 A1*   4/2012  Campagna et al. ........... 713/176

OTHER PUBLICATIONS

Hong, D., Sung, J., Hong, S., Lim, J., Lee, S., Koo, B., Lee, C., Chang, D., Lee, J., Jeong, K., Kim, H., Kim. J., Chee, S., "HIGHT: A New Block Cipher Suitable for Low-Resource Device." Cryptographic Hardware and Embedded Systems—CHES'06, Lecture Note.
Iwata, T., Kurosawa, K., "Omac: One-key cbc mac." Fast Software Encryption—FSE'03. vol. 2887, pp. 129-153. Lecture notes in computer science, Springer (2003).
Juels, A., "RFID security and privacy: A research survey." IEEE Journal on Selected Areas in Communications 24(2), 381-394 (2006).
Jutla, C., "Encryption modes with almost free message integrity." Advances in Cryptology—EUROCRYPT'01, pp. 529-544 (2001).
Jutla, C., "Encryption modes with almost free message integrity." Journal of Cryptology 21(4), 547-578 (2008).
Kaps, J., Yuksel, K., Sumar, B., "Energy scalable universal hashing." IEEE Transactions on Computers 54{12}, 1484-1495 (2005).
Katz, J. and Yung, M., "Unforegable Encryption and Chosen Ciphertext Secure Modes of Operation." In Fast Software Encryption—FSE'00, vol. 1978, pp. 284-299. Lecture Notes in Computer Science, Springer (2001).
Katz, J., Lindell, Y., "Introduction to modern cryptography." Chapman & Hall/CRC (2008).
Kavun, E.B., Yalcin, T., "A Light weight Implementation of Keccak Hash Function for Radio-Frequency Identification Applications." Workshop on RFID Security—RFIDSec'10, vol. 6370, pp. 258-269 (2010).
Kohno, T., Viega, J., Whiting, D., "CWC: A high-performance conventional authenticated encryption mode." Fast Software Encryption—FSE'04. vol. 3017, pp. 408-426. Lecture Notes in Computer Science, Springer (2004).
Krawczyk, H., "The order of encryption and authentication for protecting communications(or: How secure is SSL?)." Advances in Cryptology—CRYPTO'01. vol. 2139, pp. 310-331. Lecture Notes in Computer, Springer (2001).
Krovetz, T: http://fastcrypto.org/umac/ (2006).
Lim, C. H., Korkishko, T., "mCrypton—A Lightweight Block Cipher for Security of Low-Cost RFID Tags and Sensors." Workshop on Information Security Applications—WISA'05, Lecture Notes in Computer Science, vol. 3786, pp. 243-258. Springer (2005).
Liu, Z., Peng, D., "True Random Number Generator in RFID Systems Against Traceability." IEEE Consumer Communications and Networking Conference—CCNS'06. vol. 1, pp. 620-624. IEEE (2006).
Luby, M., Rackoff, C., "How to Construct Pseudorandom Permutations from Pseudorandom Functions." SIAM Journal on Computing 17, pp. 373-386 (1988).
Lucks, S., "Ciphers secure against related key attacks." in Fast Software Encryption, pp. 359-370. Springer (2004).
Macé, F., Standaert, F-X, Quisquater, J-J., "ASIC Implementations of the Block Cipher SEA for Constrained Applications." Workshop on RFID Security—RFIDSec'07, 12 pp. (2007).
Maurer, U., Tackmann, B., "On the soundness of authenticate-then-encrypt: formalizing the malleability of symmetric encryption." Proceedings of the 17th ACM conference on Computer and communications security—CCS'10-, pp. 505-515. ACM (2010).
McGrew, D., Viega, J., "The security and performance of the Galois/Counter Mode (GCM) of operation." Progress in Cryptology—INDOCRYPT'04, vol. 3348, pp. 343-355. Lecture notes in computer science, Springer (2004).
Menezes, A., Van Oorschot, P., Vanstone, S. "Handbook of applied cryptography." CRC (1997).
Muller, F., "Differential attacks against the Helix stream cipher." Fast Software Encryption—FSE'04. vol. 3017, pp. 94-108. Lecture Notes in Computer Science, Springer (2004).
Nakajima, J., Matsui, M., "Performance analysis and parallel implementation of dedicated hash functions." Advances in Cryptology—EUROCRYPT 2002, pp. 165-180. Springer (2002).
O'Neill (McLoone), M., "Low-Cost SHA-1 Hash Function Architecture for RFID Tags." Workshop on RFID Security—RFIDSec'08, 11 pp. (2008).
Paul, S., Preneel, B., "Near Optimal Algorithms for Solving Differential Equations of Addition with Batch Queries." Progress in Cryptology—INDOCRYPT'05. vol. 3797, pp. 90-103. Lecture Notes in Computer Science, Springer (2005).
Paul, S., Preneel, R., "Solving systems of differential equations of addition." Australasian Conference on Information Security and Privacy—ICISP'05. vol. 3574, pp. 75-88. Lecture Notes in Computer Science, Springer (2005).
Peris-Lopez, P., Hernandez-Castro, J., Estevez-Tapiador, J., Ribagorda, A. "RFID systems: A survey on security threats and proposed solutions." Personal Wireless Communications, pp. 159-170. Springer (2006).
Perrig, A., Stankovic, J., Wagner, D., "Security in wireless sensor networks." Communications of the ACM, 47(6), 53-57 (2004).
Perrig, A., Szewczyk, R., Tygar, J., Wen, V., Culler, D., "SPINS: Security protocols for sensor networks." Wireless networks 8(5), 521-534 (2002).
Petrie, C., Connelly, J., "A noise-based IC random number generator for applications in cryptography." IEEE Transactions on Circuits and Systems I: Fundamental Theory and Applications 47(5), 615-621 (2000).
Poschmann, A., Leander, G., Schramm, K, Paar, C., "A Family of Light-Weight Block Ciphers Based on DES Suited for RFID Applications." Workshop on RFID Security—RFIDSec'06. Ecrypt, 16 pp. (2006).
Preneel, B., Van Oorschot, P., "MDx-MAC and building fast MACs from hash functions." Advances in Cryptology—CRYPT0'95. vol. 963, pp. 1-14. Lecture Notes in Computer Science, Springer (1995).
Preneel, B., Van Oorschot, P., "On the security of iterated message authentication codes." IEEE Transactions on Information theory 45(1), 188-199 (1999).
Rogaway, P., Bellare, M., Black, J., and Krovetz, T., "OCB: A block cipher mode of operation for efficient authenticated encryption." In ACM Conference on Computer and Communications Security—CCS'01, pp. 196-205 (2001).
Rogaway, P., Bellare, M., Black, J., "OCB: A Block-Cipher Mode of Operation for Efficient Authenticated Encryption." ACM Transactions on Information and System Security 6(3), 365-403 (2003).
Rogaway, P., Black, J., "PMAC: Proposal to NIST for a parallelizable message authentication code." (2001).
Rogaway, P., "Authenticated encryption with associated data. In ACM Conference on Computer and Communications Security—CCS'02." pp. 98-107. ACM (2002).
Rogaway, P., "Comments on NISTs RMAC Proposal." (2002).
Sarma, S., Weis, S., Engels, D., "RFID systems and security and privacy implications." Cryptographic Hardware and Embedded Systems—CHES 2002, pp. 454-469 (2003).
Schwarz, S., "The role of semigroups in the elementary theory' of numbers." Math. Slovaca 31(4), 369-395 (1981).
Shamir, A., "SQUASH-A New Mac with Provable Security Properties for Highly Constrained Devices Such as RFID Tags." Fast Software Encryption—FSE'08. vol. 5086, pp. 144-157. Lecture Notes in Computer Science, Springer (2008).
Shoup, V., "On fast and provably secure message authentication based on universal hashing." Advances in Cryptology—CRYPTO'96, vol. 1109, pp. 313-328. Lecture Notes in Computer Science, Springer (1996).
Stinson, D., "Cryptography: Theory and Practice." CRC Press (2006).
Stinson, D., "Universal hashing and authentication codes." Designs, Codes and Cryptography 4(3), 369-380 (1994).

(56) References Cited

OTHER PUBLICATIONS

Tan, C., Wang, H., Zhong, S., Li, Q., "Body sensor network security: an identity-based cryptography approach." Proceedings of the first ACM conference on Wireless network security, pp. 148-153. ACM (2008).
Tsudik, G., "Message authentication with one-way hash functions." ACM SIGCOMM Computer Communication Review 22(5), pp. 29-38 (1992).
van Tilborg, H., " Encyclopedia of cryptography and security." Springer (2005).
Venkatasubramanian, K., Banerjee, A., Gupta, S., "Ekg-based key agreement in body sensor networks." INFOCOM Workshops 2008, IEEE, pp. 1-6. IEEE (2008).
Wagner, D. And B. Schneier., "Analysis of the SSL 3.0 protocol." USENIX Workshop on Electronic Commerce, pp. 29-40. USENIX Association (1996).
Wegman, M., Carter, J., "New classes sand applications of hash functions." 20th Annual Symposium on Foundations of Computer Science—FOCS'79, pp. 175-182. IEEE (1979).
Wegman, M., Carter, L., "New hash functions and their use in authentication and set equality." Journal of Computer and System Sciences 22(3), 265-279 (1981).
Whiting, D., Schneier, B., Lucks, S., Muller, F., "Phelix-fast encryption and authentication in a single cryptographic primitive, eSTREAM." ECRYPT Stream Cipher Project, Report 2005/020, www.ecrypt.eu.org/stream (2005).
Wu, H., Preneel, B., "Differential-linear attacks against the stream cipher Phelix." Fast. Software Encryption—FSE'07, vol. 4593, pp. 87-100. Lecture Notes in Computer Science, Springer (2007).
Ylonen, T., Lonvick, C., "The Secure Shell (SSH) Transport Layer Protocol." Tech. rep., RFC 4253 (2006).
Akyildiz, I., Su, W., Sankarasubramaniam, Y., Cayirci, E., "Wireless sensor networks: a survey." Computer Networks 39(4), 393-422 (2002).
Alomair, B., Clark, A., Poovendran, R., "The Power of Primes: Security of Authentication Based on a Universal Hash-Function Family." Journal of Mathematical Cryptology 4(2):121-148 (2010).
Alomair, B., Poovendran, R., "E-MACs: Towards More Secure and More Efficient Constructions of Secure Channels." The 13th International Conference on Information Security and Cryptology—ICISC'10, pp. 292-310 Springer (2010).
Alomair. B., Poovendran. R., "Efficient Authentication for Mobile and Pervasive Computing." The 12th International Conference on Information and Communications Security—ICICS'10, pp. 186-202, Springer (2010).
Atici, M., Stinson, D., "Universal Hashing and Multiple Authentication." Advances in Cryptology—CRYPTO'96. vol. 96, pp. 16-30. Lecture Notes in Computer Science, Springer (1996).
Bao, S-D, Zhang, Y-T, Shen, L-F., "A design proposal of security architecture for medical body sensor networks." Wearable and Implantable Body Sensor Networks, 2006. BSN 2006, International Workshop on, vol. 90, 4 pp. IEEE (2006).
Bellare, M. And Kohno, T., "A Theoretical Treatment of Related-Key Attacks: RKA-PRPs, RKA-PRFs, and Applications." Advances in Cryptology—EUROCRYPT'03, pp. 491-506 (2003).
Bellare, M., Canetti, R., Krawczyk, H., "Keying Hash Functions for Message Authentication." Advances in Cryptology—CRYPTO'96. vol. 96, pp. 1-15. Lecture Notes in Computer Science, Springer (1996).
Bellare, M., Desai, A., Jokipii, E., Rogaway, P., "A concrete security treatment of symmetric encryption." 38th Annual Symposium on Foundation of Computer Science—FOCS'97, pp. 394-403. IEEE Computer Society (1997).
Bellare, M., Guerin, R., Rogaway, P., "XOR MACs: New methods for message authentication using finite pseudorandom functions." Advances in Cryptology—CRYPTO'95, vol. 963, pp. 15-28. Lecture Notes in Computer Science, Springer (1995).
Bellare, M., Kilian, J ., Rogaway, P., "The Security of the Cipher Block Chaining Message Authentication Code." Journal of Computer and System Sciences 61(3), 362-399 (2000).

Bellare, M., Kohno, T., Namprempre, C., "Breaking and Provably Repairing the SSH Authenticated Encryption Scheme: A Case Study of the Encode-then-Encrypt-and-MAC Paradigm." ACM Transactions on Information and System Security 7(2), pp. 206-241 (2004).
Bellare, M., Kohno, T., Namprepre, C., "Authenticated Encryption in SSH: Provably Fixing the SSH Binary Packet Protocol." ACM Conference on Computer and Communications Security—CCS'02, pp. 1-11. ACM (2002).
Bellare, M., Namprempre, C., "Authenticated Encryption: Relations Among Notions and Analysis of the Generic Composition Paradigm." Journal of Cryptology 21(4), 469-491 (2008).
Bellare, M., Rogaway, P., Wagner, D., "The EAX mode of operation." Proceedings of Fast Software Encryption—FSE'04. vol. 3017, pp. 389-407. Lecture Notes in Computer Science, Springer (2004).
Bellovin, S.M., "Problem Areas for the IP Security Protocols." USENIX Security Symposium—USENIX'96, pp. 205-214. USENIX Association (1996).
Bernstein, D., "Floating-point arithmetic and message authentication." http://cr.yp.to/hash127.html (2004).
Bernstein, D., "The Poly1305-AES message-authentication code." Proceedings of Fast Software Encryption—FSE'05, vol. 3557, pp. 32-49. Lecture Notes in Computer Science, Springer (2005).
Bierbrauer, J., "Universal hashing and geometric codes." Designs, Codes and Cryptography, 11(3), 207-221 (1997).
Bierbrauer, J., "A2-codes from universal hash classes." Advances in Cryptology—EUROCRYPT'95, vol. 921, pp. 311-318. Lecture Notes in Computer Science, Springer (1995).
Biham, E., "New Types of Cryptanalytic Attacks Using Related Keys." Advances in Cryptology—EUROCRYPT'93, pp. 398-409. Springer (1994).
Black, J. And Rogaway, P., "A block cipher mode of operation for parallelizable message authentication." Advances in Cryptology—EUROCRYPT'02, pp. 384-397. Springer (2002).
Black, J., Halevi, S., Krawczyk, H., Krovetz, T., Rogaway, P., "UMAC: Fast and Secure Message Authentication." Advances in Cryptology—CRYPTO'99. vol. 1666, pp. 216-233. Lecture Notes in Computer Science, Springer (1999).
Bogdanov, A., Leander, G., Paar, C., Poschmann, A., Robshaw, M., Seurin, Y., "Hash Functions and RFID Tags: Mind The Gap." Proceedings of the 10th International Workshop Cryptographic Hardware and Embedded Systems—CHES 2008, Lecture Notes in Computer S.
Bogdanov, A., Knudsen, L., Leander, G., Paar, C., Poschmann, A., Robshaw, M., Seurin, Y., Vikkelsoe, C., "Present: An Ultra,-Lightweight Block Cipher." Cryptographic Hardware and Embedded Systems—CHES 2007. vol. 4727, pp. 450-466. Lecture Notes in Computer.
Bosselaers, a., Govaerts, R., Vandewalle, J., "Fast hashing on the Pentium." Advances in Cryptology—CRYPTO'96, vol. 1109, pp. 298-312. Lecture Notes in Computer Science, Springer (1996).
Callegari, S., Rovatti, R., Setti, G., "Embeddable ADC-based true random Number generator for cryptographic applications exploiting nonlinear signal processing and chaos." IEEE Transactions on Signal Processing 53 (Part 2), pp. 793-805 (2005).
Canetti, H. And H. Krawczyk., "Analysis of Key Exchange Protocols and Their Use for Building Secure Channels." Advances in Cryptology—EUROCRYPT'01, vol. 2045, pp. 453-474. Lecture Notes in Computer Science, Springer (2001).
Carter, J., Wegman, M., "Universal classes of hash functions." Proceedings of the ninth annual ACM symposium on Theory of computing—STOC'77, pp. 106-112. ACM (1977).
Carter, L., Wegman, M., "Universal hash functions." Journal of Computer and System Sciences 18(2), 143-154 (1979).
Daemen, J., Rijmen, V., "The design of Rijndael: AES—The Advanced Encryption Standard." Springer Verlag (2002)..
Degabriele, J. And Paterson, K., "On the (in)security of IPsec in MAC-then-encrypt configurations." Proceedings of The 17th ACM Conference on Computer and Communications Security—CCS'10, pp. 493-504, ACM (2010).
Dierks, T., Rescorla, E., "The transport layer security (TLS) protocol version 1.2." Tech. rep., RFC 5246 (2008).
Dworkin, M., "NIST Special Publication SP800-38D defining GCM and GMAC" (2007).

(56) References Cited

OTHER PUBLICATIONS

Dworkin, M., "Recommendation for block cipher modes of operation" The CMAC mode for authentication (2005).

Etzel, M., Patel, S., Ramzan, Z., "Square hash: Fast message authentication via optimized universal hash functions." Advances in Cryptology—CRYPT0'99. vol. 1666, pp. 234-251. Lecture Notes in Computer Science, Springer (1999).

Feldhofer, M., Dominikus, S., Wolkerstorfer, J., "Strong Authentication for RFID Systems using the AES Algorithm." Cryptographic Hardware and Embedded Systems—CHES'04. vol. 3156, pp. 357-370. Lecture Notes in Computer Science, Springer (2004).

Ferguson, N., Whiting, D., Schneier, 13., Kelsey, J., Kohno, T., "Helix: Fast encryption and authentication in a single cryptographic primitive." Proceedings of Fast Software Encryption—FSE'03. vol. 2887, pp. 330-346. Lecture notes in Computer science, S.

FIPS 113 "Computer Data Authentication." Federal Information Processing Standards Publication, 113 (1985).

FIPS 198 "The Keyed-Hash Message Authentication Code (HMAC)." Federal Information Processing Standards Publication 198 (2002).

Francillon, a., Castelluccia, C., Inria, P. "TinyRNG: A cryptographic random number generator for wireless sensors network nodes." Modeling and Optimization in Mobile, Ad Hoc and Wireless Networks—Wi0pt'07. pp. 1-7. Citeseer (2007).

Freier, a., Karlton: P., Kocher, P., "The SSL Protocol Version 3.0" (1996).

Fürer, M., "Faster integer multiplication." ACM symposium on Theory of computing—STOC'07, pp. 57-66. ACM (2007).

Goldreich, O., "Foundations of Cryptography." Cambridge University Press (2001).

Goldwasser, S., Micali, S., "Probabilistic encryption." Journal of Computer and System Sciences 28(2), 270-299 (1984).

Gubner, J., "Probability and random processes for electrical and computer engineers." Cambridge University Press (2006).

Halevi, S., Krawczyk, H., "MMH: Software message authentication in the Gbit/second rates." Proceedings of Fast Software Encryption—FSE'97. vol. 1267, pp. 172-189. Lecture notes in computer science, Springer (1997).

Helleseth, T., Johansson, T., "Universal hash functions from exponential sums over finite fields and Galois rings." Advances in cryptology—CRYPTO'96, vol. 1109, pp. 31-44. Lecture Notes in Computer Science, Springer (1996).

Holcom, D., Burleson, W., Fu, K., "Initial SRAM state as a Fingerprint and Source of True Random Numbers for RFID Tags." Workshop on RFID Security—RFIDSec'07, 12 pp. (2007).

Holcomb, D., Burleson, W., Fu, K., "Power-up SRAM State as an Identifying Fingerprint and Source of True Random Numbers." IEEE Transactions on Computers 58(9), pp. 1198-1210 (2009).

\* cited by examiner

EFFICIENT AUTHENTICATION FOR MOBILE AND PERVASIVE COMPUTING

CROSS-REFERENCE TO RELATED APPLICATION

This application claims the benefit of U.S. Provisional Patent Application No. 61/566,901, entitled EFFICIENT AUTHENTICATION FOR MOBILE AND PERVASIVE COMPUTING, filed Dec. 5, 2011, which is hereby incorporated by reference in its entirety.

STATEMENT REGARDING FEDERALLY SPONSORED RESEARCH

This invention was made with government support under W911NF-05-1-0491 and W911NF-07-1-0287, both awarded by U.S. Army Research Office. The government has certain rights in the invention.

BACKGROUND

The authentication of messages exchanged over public channels is an important goal in cryptography. A message is authenticated when both the integrity and the authenticity of the message are verified. The integrity of a message is verified when the message has not been modified, and the authenticity of a message is verified when the message is confirmed to be sent by the purported sender. Typically, a sender of a message encrypts the message, generates a message authentication code ("MAC") from the message, and transmits the encrypted message and the MAC to a receiver. The receiver uses the MAC to authenticate the message. Many algorithms have been designed for the sole purpose of authenticating. Based on needed security, MACs can be either unconditionally or computationally secure. Unconditionally secure MACs are secure against forgers with unlimited computational power, while computationally secure MACs are secure only when forgers have limited computational power.

A popular class of unconditionally secure MAC algorithms is based on universal hash-function families developed by Carter and Wegman. (Carter, J., Wegman, M., "Universal Classes of Hash Functions," in Proceedings of the 9th Annual ACM Symposium on Theory of Computing—STOC '77, pp. 106-112, ACM (1977).) The basic concept allowing for unconditional security is that the authentication key can be used to authenticate only a limited number of exchanged messages. Since the management of one-time keys is considered impractical in many applications, computationally secure MACs, rather than unconditionally secure MACs, are used for most practical applications. With computationally secure MACs, keys can be used to authenticate an arbitrary number of messages. That is, after agreeing on a key, legitimate users can exchange an arbitrary number of authenticated messages with the same key. Computationally secure MACs can be classified into three main categories: block cipher, cryptographic hash function, or universal hash-function family.

The cipher-block chaining MAC ("CBC-MAC") is one of the most well-known block cipher based MACs. The CBC-MAC is specified in many governmental and international standards. The exclusive OR ("XOR-MAC") and parallelizable MAC ("PMAC") are other well-known block ciphers.

The use of one-way cryptographic hash functions for message authentication was introduced by Tsudik. Examples of cryptographic hash functions for MACs include the hash-based MAC ("HMAC") and the message digest x MAC ("MDx-MAC"), which are specified in the International Organization for Standardization ISO/IEC 9797-2.

The use of universal hash-function families in the Carter-Wegman style is not restricted to the design of unconditionally secure MACs. Rather, computationally secure MACs based on universal hash functions can be constructed with two rounds of computations. In the first round, the message to be authenticated is compressed using a universal hash function. Then, in the second round, the compressed image is processed with a cryptographic function (e.g., a pseudorandom function).

Indeed, universal hashing based MACs give better performance when compared to block cipher or cryptographic hashing based MACs. There are two main factors leading to the performance advantage of universal hashing based MACs. First, processing messages block by block using universal hash functions is faster than processing messages block by block using block ciphers or cryptographic hash functions. Second, since the output of the universal hash function is much shorter than the original message itself, processing the compressed image with a cryptographic function can be performed efficiently.

One of the main differences between unconditionally secure MACs based on universal hashing and computationally secure MACs based on universal hashing is the requirement to process the compressed image with a cryptographic primitive with the computationally secure MACs. This round of computation is necessary to protect the secret key of the universal hash function. That is, since universal hash functions are not cryptographic functions, the observation of multiple message image pairs can reveal the value of the hashing key. Since the hashing key is used repeatedly in computationally secure MACs, the exposure of the hashing key will lead to breaking the security of the MAC. Thus, processing the compressed image with a cryptographic primitive is necessary for the security of this class of MACs. This implies that unconditionally secure MACs based on universal hashing are more efficient than computationally secure ones. On the negative side, unconditionally secure universal hashing based MACs are considered impractical in most modern applications, due to the difficulty of managing one-time keys.

A couple of observations can be made about existing MAC algorithms. First, they are designed independently of any other operations required to be performed on the message to be authenticated. For example, if the authenticated message must also be encrypted, existing MACs are not designed to utilize the functionalities that can be provided by the underlying encryption algorithm. Second, most existing MACs are designed for general computer communication systems, independently of the properties that messages can possess. For example, most existing MACs are inefficient when the messages to be authenticated are short.

There is, however, an increasing demand for the deployment of networks consisting of a collection of small devices. In many practical applications, the main purpose of such devices is to communicate short messages. A sensor network, for example, can be deployed to monitor certain events and report some collected data. In many sensor network applications, reported data consist of short confidential measurements. For example, the ability to authenticate messages in a sensor network deployed in a battlefield with the purpose of reporting the existence of moving targets or other temporal activities is of critical importance. In another application, the radio frequency identification (RFID) systems also send short confidential messages. In such systems, RFID readers need to identify RFID tags. In such scenarios, RFID tags usually encrypt their identity, which is typically a short string, to protect their privacy. Since the RFID readers also authenticate the identity of the RFID tag, RFID tags are equipped with a message authentication mechanism. Another application that is becoming increasingly important is the deployment of body sensor networks. In such body sensor networks, small sensors are embedded in a patient to report some vital signs. The confidentiality and integrity of such reported messages can be important.

Significant effort has been devoted to the design of hardware efficient implementations for such small devices. For example, many hardware efficient implementations of block ciphers and cryptographic hash functions have been proposed. However, little or no effort has been devoted to the design of algorithms for message authentication codes for such networks. Because of the computational expense of existing MAC techniques, it would be desirable to have a technique for authenticating short encrypted messages that is more efficient than existing MAC algorithms.

DETAILED DESCRIPTION

Figure 1:
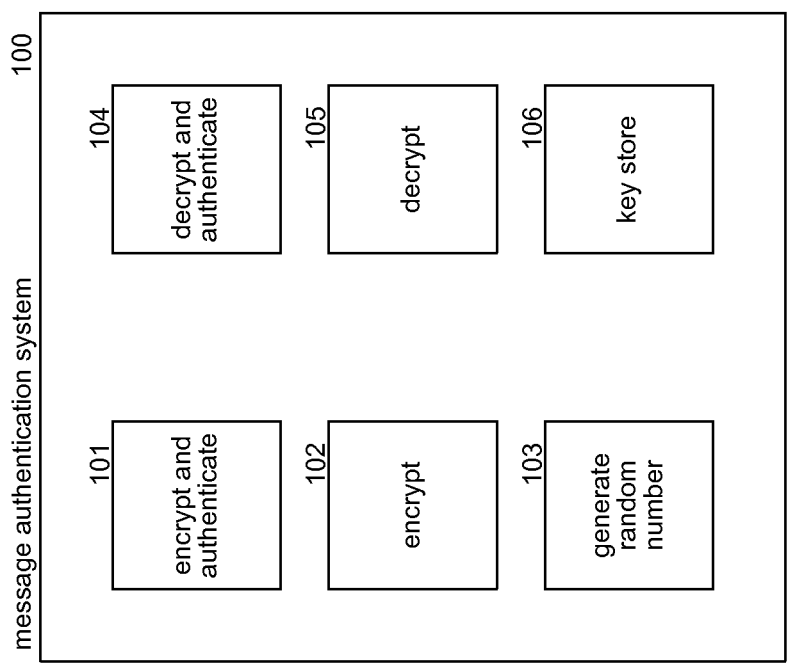
FIG. 1 is a block diagram that illustrates components of the message authentication system in some embodiments.

A method and system for authenticating messages is provided. In some embodiments, a message authentication system at a sender's device encrypts a message and generates a message authentication code ("MAC") for the message. The message authentication system generates an encrypted message by encrypting with a key a combination of the message and a nonce, which may be a random or pseudorandom number. The key is shared between the sender and the receiver of the message. The message authentication system generates the message authentication code based on a combination of the message and the nonce modulo a divisor. The encrypted message and the message authentication code are then sent to the receiver. After receiving the encrypted message and the message authentication code, the message authentication system of the receiver's device decrypts and authenticates the message. The message authentication system generates a decrypted message by decrypting with the key the encrypted message and extracts the message and the nonce. The message authentication system then regenerates a message authentication code based on a combination of the extracted message and the extracted nonce modulo the divisor. The message authentication system then determines whether the regenerated message authentication code matches the received message authentication code. If the codes match, then the integrity and authenticity of the message are verified.

In some embodiments, the message authentication system employs an authentication algorithm that is secure regardless of the type of encryption algorithm (e.g., stream cipher or block cipher), referred to as a universal MAC algorithm. The universal MAC algorithm generates an encrypted message by encrypting with an encryption key a concatenation of the message with the nonce as represented by the following equation:

$$c = E_{k_e}(m\|r) \qquad (1)$$

where c represents the encrypted message, m represents the message, r represents the nonce, $k_e$ represents the encryption key, $E_{k_e}$ represents the encryption function, and $\|$ represents concatenation. The length of the message may have an upper bound of N−1 bits. The nonce may be selected randomly from the finite integer ring with the addition and multiplication operations performed modulo p (i.e., $Z_p$). The keys may be selected uniformly at random from a multiplicative group modulo p (i.e., $Z^*_p$). In the equations, the message m and nonce r are overloaded to represent either a binary string or their corresponding integer values. The universal MAC algorithm generates the message authentication code by generating a dividend by multiplying the message by an authentication key and adding the nonce and taking the dividend modulo a divisor that is a prime number as represented by the following equation:

$$\tau \equiv mk_s + r \pmod{p} \qquad (2)$$

where $\tau$ represents the message authentication code, $k_s$ represents the authentication key and p represents a prime number. The prime number may have a length of N bits. If, however, N is too small to provide the desired security level, then the prime number can be longer. Although Equations 1 and 2 illustrate the use of different encryption and authentication keys, the encryption key and the authentication key may be the same or different keys. To authenticate the message, the universal MAC algorithm generates a decrypted message by decrypting, using the encryption key, the encrypted message as represented by the following equation:

$$m\|r = E_{k_e}^{-1}(c) \qquad (3)$$

where $E_{k_e}^{-1}$ represents the decryption function corresponding to the encryption function $E_{k_e}$. The universal MAC algorithm assumes that the key and the prime number are shared by the sender and the receiver. Although the encryption key is shared secretly, the prime number need not be secret. The universal MAC algorithm then extracts the message and the nonce. The universal MAC algorithm then regenerates the message authentication code using Equation 2. The universal MAC algorithm compares the regenerated message authentication code to the originally generated authentication code to authenticate the message.

In some embodiments, the message authentication system employs an authentication algorithm that is secure when the encryption algorithm is a block cipher, referred to as a block cipher MAC algorithm. The block cipher MAC algorithm generates an encrypted message by encrypting a message and a nonce. Depending on the length of the message and the nonce, the block cipher MAC algorithm may apply a single block cipher to a concatenation of the message and the nonce. If, however, the message and the nonce are too long to encrypt in a reasonable amount of time using a single block cipher, then the block cipher MAC algorithm may use a cipher-block chaining algorithm as described in the following. The block cipher MAC algorithm first generates an encrypted nonce part by encrypting, using an encryption key, an exclusive OR of an initialization vector and a nonce as represented by the following equation:

$$c_1 = F_{k_e}(IV \oplus r) \quad (4)$$

where $c_1$ represents the encrypted nonce, IV represents the initialization vector, and $F_{k_e}$ represents the block cipher encryption function that maps an N-bit string to an N-bit string. The nonce is selected randomly from the finite integer ring with the addition and multiplication operations performed modulo $2^N$ (i.e., $Z_{2^N}$). The initialization vector is a single use and randomly generated. The block cipher MAC algorithm then generates an encrypted message part by encrypting, using the encryption key, an exclusive OR of the encrypted nonce and the message as represented by the following equation:

$$c_2 = F_{k_e}(c_1 \oplus m) \quad (5)$$

where $c_2$ represents the encrypted message part. The block cipher MAC algorithm then concatenates the initialization vector, the encrypted nonce part, and the encrypted message part as represented by the following equation:

$$c = \epsilon(r, m) = IV \| c_1 \| c_2 \quad (6)$$

where $\epsilon$ represents an encryption of a combination of the message and the nonce. The block cipher MAC algorithm generates the message authentication code by generating a dividend that is the sum of the message and the nonce and taking the dividend modulo a divisor that is a power of two as represented by the following equation:

$$\tau \equiv m + r \pmod{2^N} \quad (7)$$

To authenticate the message, the block cipher MAC algorithm generates a decrypted message by decrypting, using the encryption key, the encrypted message part as represented by the following equation:

$$c_1 \oplus m = F_{k_e}^{-1}(c_2) \quad (8)$$

where $F_{k_e}^{-1}$ represents the decryption function corresponding to the encryption function $F_{k_e}$. The block cipher MAC algorithm then extracts the message by taking the exclusive OR of the decrypted message part and the encrypted nonce. The block cipher MAC algorithm then generates the decrypted nonce by decrypting, using the encryption key, the encrypted nonce part as represented by the following equation:

$$IV \oplus r = F_{k_e}^{-1}(c_1) \quad (9)$$

The block cipher MAC algorithm then extracts the nonce by taking the exclusive OR of the decrypted nonce part and the initialization vector. The block cipher MAC algorithm then regenerates the message authentication code using Equation 7. The block cipher MAC algorithm compares the regenerated message authentication code to the originally generated authentication code to authenticate the message.

FIG. 1 is a block diagram that illustrates components of the message authentication system in some embodiments. The message authentication system 100 includes an encrypt and authenticate component 101, an encrypt component 102, a generate random number component 103, a decrypt and authenticate component 104, a decrypt component 105, and a key store 106. The encrypt and authenticate component and the decrypt and authenticate component may be implemented as a universal MAC algorithm or a block cipher MAC algorithm using a single block cipher ("BC") or a cipher-block chaining ("CBC"). The encrypt component and the decrypt component implement the encryption and decryption algorithms. The generate random number component is invoked to generate the nonce. The key store stores the shared encryption key and also stores the prime number for the universal MAC algorithm.

The message authentication system may be implemented on a computing device that includes a central processing unit and local memory and may include input devices (e.g., keyboards and pointing devices), output devices (e.g., display devices), and storage devices (e.g., disk drives). The central processing unit may access computer-readable media that includes computer-readable storage media and data transmission media. The computer-readable storage media includes memory and other storage devices that may have recorded upon or may be encoded with computer-executable instructions or logic that implements the message authentication system. The data transmission media is media for transmitting data using signals or carrier waves (e.g., electromagnetism) via a wire or wireless connection. Various functions of the message authentication system may also be implemented as a computing device using discrete logic or logic embedded as an application-specific integrated circuit.

The message authentication system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

Figure 2:
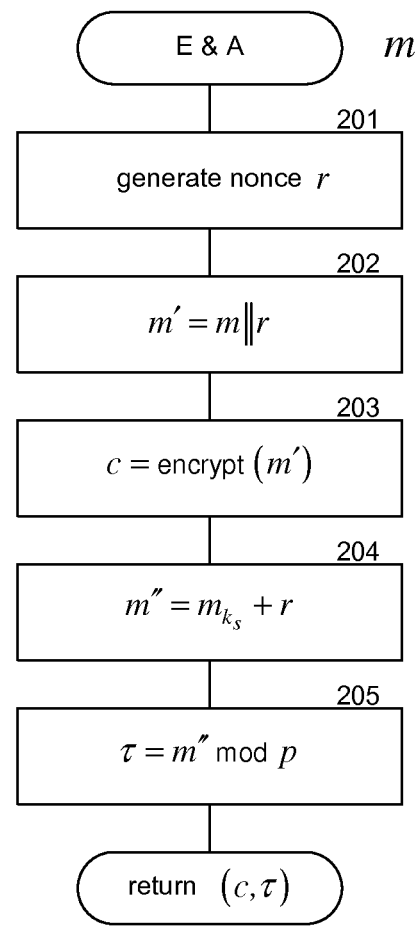
FIG. 2 is a flow diagram that illustrates the processing of the encrypt and authenticate component of the universal MAC algorithm in some embodiments.

FIG. 2 is a flow diagram that illustrates the processing of the encrypt and authenticate component of the universal MAC algorithm in some embodiments. The component is passed a message and returns the encrypted message and the message authentication code. In block 201, the component generates the nonce. In block 202, the component concatenates the message and the nonce. In block 203, the component generates the encrypted message by encrypting the concatenated message and the nonce. In block 204, the component generates a dividend by multiplying the encrypted message and the authentication key and adding the nonce. In block 205, the component generates the message authentication code as the dividend modulo a divisor that is a prime number. The component then returns the encrypted message and the message authentication code.

Figure 3:
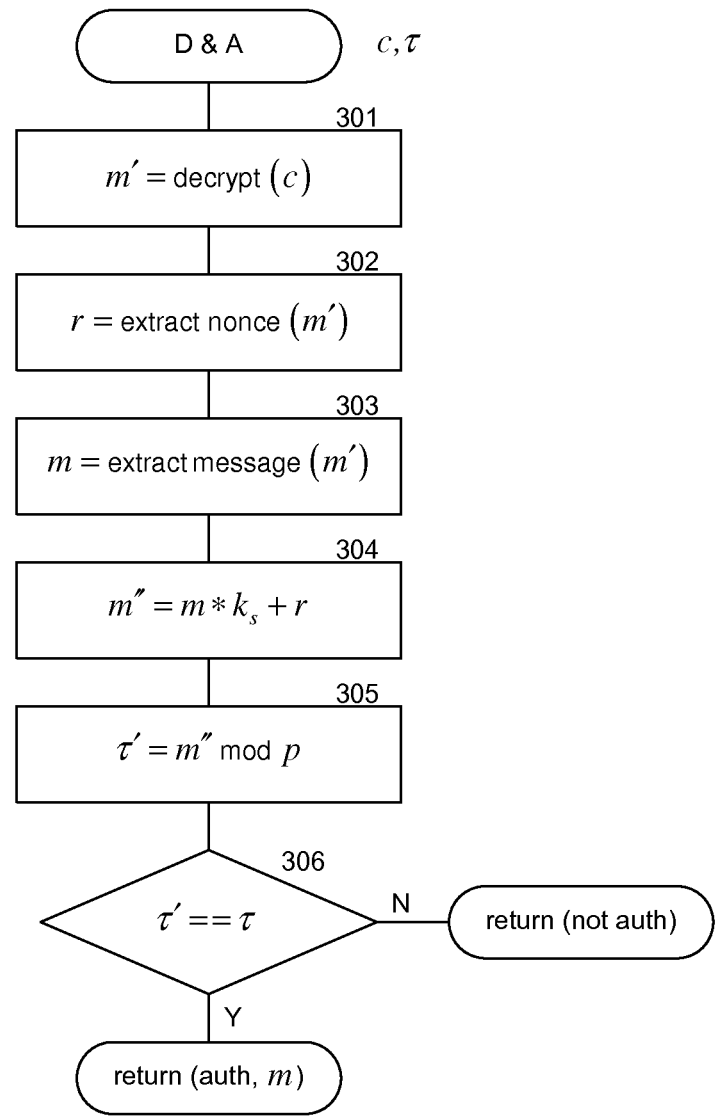
FIG. 3 is a flow diagram that illustrates the processing of the decrypt and authenticate component of the universal MAC algorithm in some embodiments.

FIG. 3 is a flow diagram that illustrates the processing of the decrypt and authenticate component of the universal MAC algorithm in some embodiments. The component is passed an encrypted message and a message authentication code and returns an indication of whether the message has been authenticated and, if so, the decrypted message. In block 301, the component decrypts the encrypted message. In block 302, the component extracts the nonce from the decrypted message. In block 303, the component extracts the message of the decrypted message. In block 304, the component generates a dividend by multiplying the encrypted message and the authentication key and adding the nonce. In block 305, the component regenerates the message authentication code as the dividend modulo a divisor that is the prime number. In decision block 306, if the regenerated message authentication code equals the passed message authentication code, then the component returns an indication that the message has been authenticated along with the message, else the component returns an indication that the message has not been authenticated.

Figure 4:
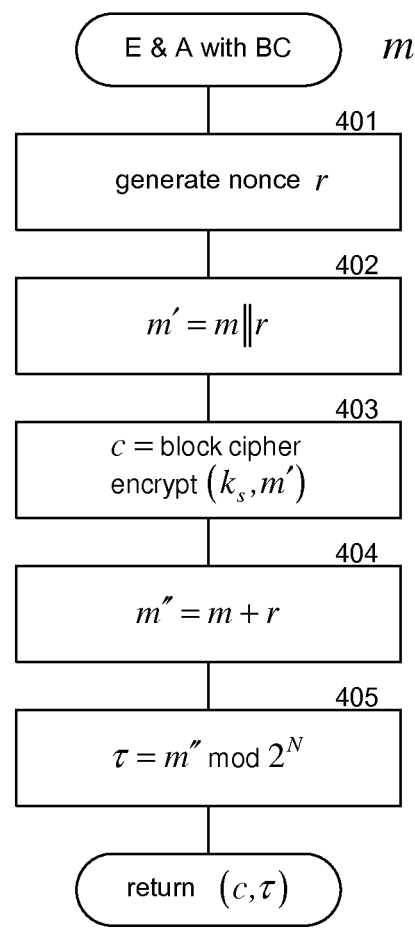
FIG. 4 is a flow diagram that illustrates the processing of an encrypt and authenticate with a single block cipher component in some embodiments.

FIG. 4 is a flow diagram that illustrates the processing of an encrypt and authenticate with a single block cipher component in some embodiments. The component is passed a message and returns the encrypted message and the message authentication code. In block 401, the component generates a nonce. In block 402, the component concatenates the message and the nonce. In block 403, the component block cipher encrypts, using an encryption key, the message concatenated with the nonce. In block 404, the component generates a dividend as the sum of the message and the nonce. In block 405, the component generates the message authentication code as the dividend modulo a divisor that is a power of two. The component then returns the encrypted message and the message authentication code.

Figure 5:
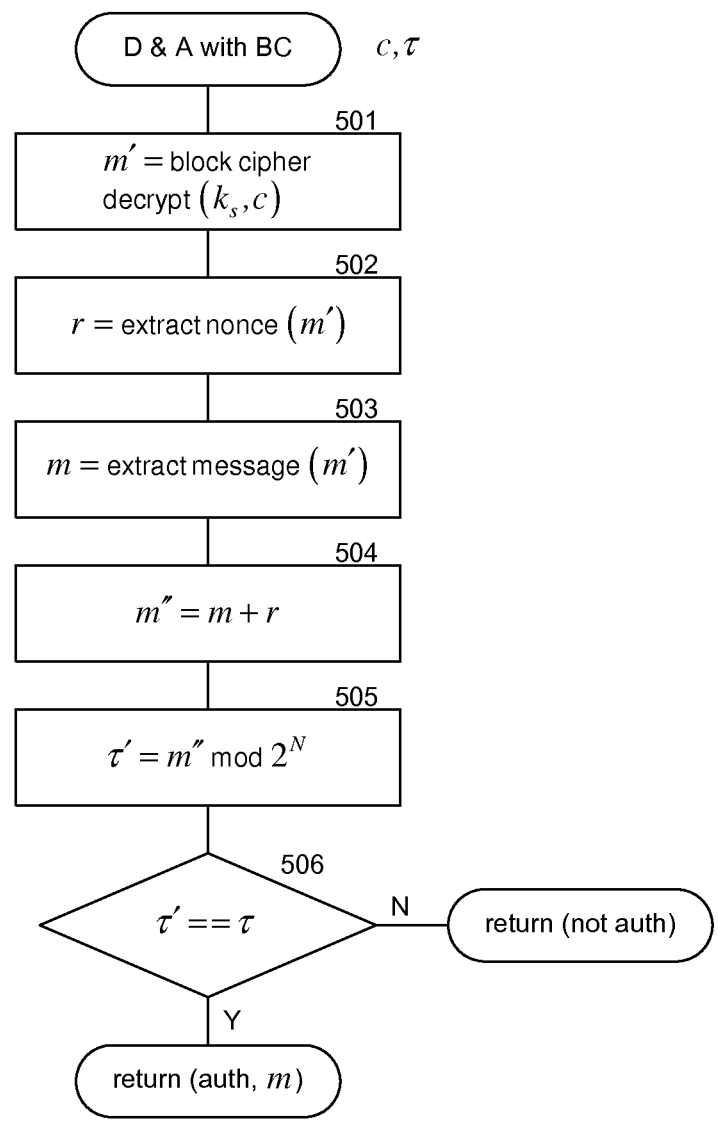
FIG. 5 is a block diagram that illustrates the processing of the decrypt and authenticate with a single block cipher component in some embodiments.

FIG. 5 is a block diagram that illustrates the processing of the decrypt and authenticate with a single block cipher component in some embodiments. The component is passed an encrypted message and a message authentication code and returns an indication of whether the message has been authenticated and, if so, the message. In block 501, the component block cipher decrypts, using the encryption key, the encrypted message. In block 502, the component extracts the nonce from the decrypted message. In block 503, the component extracts the message from the encrypted message. In block 504, the component generates a dividend that is the sum of the message and the nonce. In block 505, the component regenerates the message authentication code as the dividend modulo a divisor that is a power of two. In decision block 506, if the regenerated message authentication code equals the passed message authentication code, then the component returns an indication that the message has been authenticated along with the message, else the component returns an indication that the message has not been authenticated.

Figure 6:
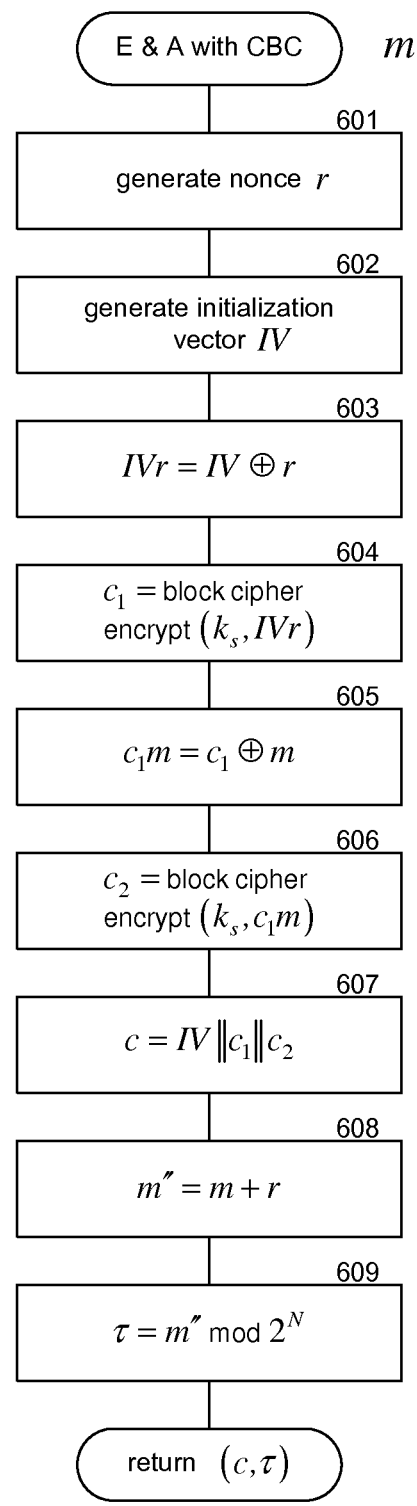
FIG. 6 is a flow diagram that illustrates the processing of the encrypt and authenticate with a cipher-block chaining component in some embodiments.

FIG. 6 is a flow diagram that illustrates the processing of the encrypt and authenticate with a cipher-block chaining component in some embodiments. The component is passed the message and returns an encrypted message and a message authentication code. In block 601, the component generates a nonce. In block 602, the component generates an initialization vector. In block 603, the component generates the exclusive OR of the initialization vector and the nonce. In block 604, the component generates an encrypted nonce part by block cipher encrypting using the encryption key the exclusive OR of the initialization vector and the nonce. In block 605, the component generates the exclusive OR of the encrypted nonce part and the message. In block 606, the component generates an encrypted message part by block cipher encrypting, using the encryption key, the exclusive OR of the encrypted nonce part and the message. In block 607, the component generates the encrypted message by concatenating the initialization vector, the encrypted nonce part, and the encrypted message part. In block 608, the component generates a dividend as the sum of the message and the nonce. In block 609, the component generates the message authentication code as the dividend modulo a divisor that is a power of two. The component then returns the encrypted message and the message authentication code.

Figure 7:
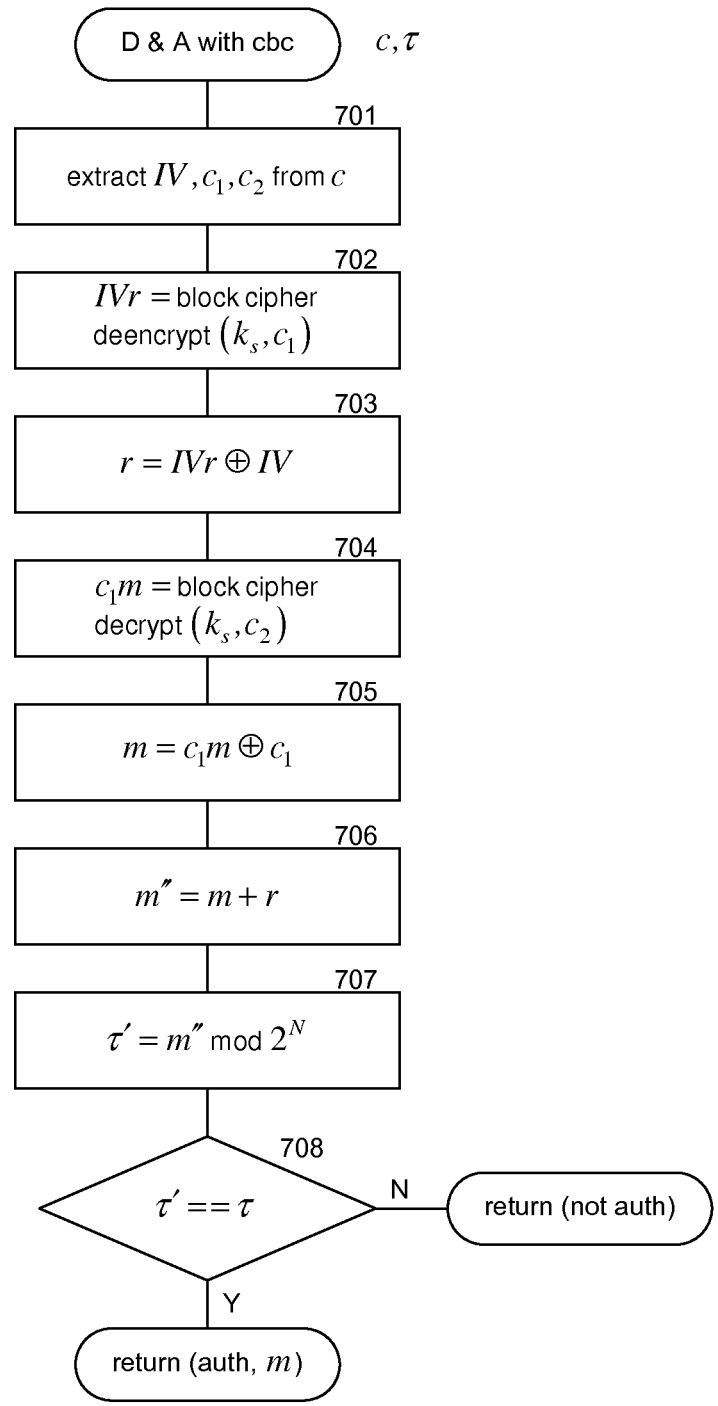
FIG. 7 is a flow diagram that illustrates the processing of a decrypt and authenticate with a cipher-block chaining component in some embodiments.

FIG. 7 is a flow diagram that illustrates the processing of a decrypt and authenticate with a cipher-block chaining component in some embodiments. The component is passed an encrypted message and a message authentication code and returns an indication of whether the message has been authenticated and, if so, the message. In block 701, the component extracts the initialization vector, the encrypted nonce part, and the encrypted message part from the encrypted message. In block 702, the component extracts the exclusive OR of the initialization vector and the nonce by block cipher decrypting, using the encryption key, the encrypted nonce part. In block 703, the component extracts the nonce by taking the exclusive OR of the extracted exclusive OR of the initialization vector and nonce and the initialization vector. In block 704, the component extracts the exclusive OR of the encrypted nonce part and the message by block cipher decrypting, using the encryption key, the encrypted message part. In block 705, the component extracts the message by taking the exclusive OR of the extracted exclusive OR of the encrypted nonce part and the message and the encrypted nonce part. In block 706, the component generates a dividend that is the sum of the decrypted message and the nonce. In block 707, the component regenerates the message authentication code as the dividend modulo a divisor that is a power of two. In decision block 708, if the generated message authentication code equals the passed message authentication code, then the component returns an indication that the message has been authenticated along with the message, else the component returns an indication that the message has not been authenticated.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device to provide authentication for a message, the method comprising:
generating by the computing device an encrypted message by encrypting with an encryption key an encryption combination of the message and a nonce;
generating by the computing device an authentication code based on a result of an authentication combination of the message and the nonce modulo a divisor;
sending by the computing device the encrypted message and the authentication code to another computing device with access to the encryption key wherein upon receiving the encrypted message and the authentication code, the other computing device decrypts the received encrypted message with the encryption key and extracts the message and the nonce, regenerates the authentication code based on the authentication combination of the extracted message and the extracted nonce modulo the divisor, and when the generated authentication code matches the regenerated authentication code, verifies integrity and authenticity of the extracted message; and
receiving the encrypted message and authentication code at the other computing device and verifying the integrity and authenticity of the encrypted message by decrypting the message, extracting the nonce, regenerating the authentication code, and comparing the regenerating authentication code to the generated authentication code.

2. The method of claim 1 wherein the encryption combination of the message and the nonce is a concatenation of the message and the nonce.

3. The method of claim 2 wherein the authentication combination of the message and the nonce is an addition of the nonce to the message multiplied by an authentication key.

4. The method of claim 3 wherein the divisor is a prime number.

5. The method of claim 1 wherein the authentication combination of the message and the nonce is an addition of the nonce to the message multiplied by an authentication key.

6. The method of claim 5 wherein the divisor is a prime number.

7. The method of claim 1 further comprising:
receiving by the other computing device the encrypted message and the authentication code;
decrypting by the other computing device the received encrypted message with the encryption key;
extracting by the other computing device the decrypted message and the decrypted nonce;
regenerating by the other computing device the authentication code based on the authentication combination of the extracted message and the extracted nonce modulo the divisor; and
determining by the other computer device the integrity and the authenticity of the extracted message when the received authentication code matches the regenerated authentication code.

8. A method performed by a computing device to provide authentication for a message, the method comprising:
generating by the computing device an encrypted message by encrypting with a key an encryption combination of the message and a nonce, the encrypting being based on a block cipher;
generating by the computing device an authentication code based on a result of an authentication combination of the message and the nonce modulo a divisor;
sending by the computing device the generated encrypted message and the generated authentication code to another computing device with access to the key and the divisor so that the other computing device can verify the integrity and authenticity of encrypted message; and
receiving the encrypted message and authentication code at the other computing device and verifying the integrity and authenticity of the encrypted message.

9. The method of claim 8 wherein the encryption combination of the message and the nonce is a concatenation of the message and the nonce that is encrypted as a block.

10. The method of claim 9 wherein the authentication combination is a sum of the message and the nonce modulo a power of two.

11. The method of claim 8 wherein the authentication combination is a sum of the message and the nonce modulo a power of two.

12. The method of claim 8 wherein the encrypting is based on cipher-block chaining.

13. The method of claim 12 wherein the encryption combination includes an encrypted nonce part based on encrypting with the key an exclusive OR of an initialization vector and a nonce.

14. The method of claim 13 wherein the encryption combination includes an encrypted message part based on encrypting with the key an exclusive OR of the encrypted nonce part and the message.

15. The method of claim 14 wherein the encrypted message includes the initialization vector, the encrypted nonce part, and the encrypted message part.

16. The method of claim 15 wherein the authentication combination is a sum of the message and the nonce modulo a power of two.

17. The method of claim 14 wherein the authentication combination is a sum of the message and the nonce modulo a power of two.

18. The method of claim 12 wherein the authentication combination is a sum of the message and the nonce modulo a power of two.

19. One or more computer-readable storage media that are not a transitory, propagating signal storing computer-executable instructions for controlling a device to generate an authentication code for a message, the instructions comprising:
instructions that generate an encrypted message by encrypting with an encryption key a concatenation of the message and a nonce;
instructions that generate an authentication code by generating a dividend by multiplying the message by an authentication key and adding the nonce and setting the authentication code to the dividend modulo a divisor that is a prime number;
instructions that send to another device the generated encrypted message and the generated authentication code so that the other device can decrypt the generated encrypted message using the encryption key to generate a decrypted message and a decrypted nonce and regenerate the authentication code using the decrypted message, the decrypted nonce, and the divisor to verify integrity and authenticity of the decrypted message; and
instructions that verify the integrity and authenticity of an encrypted message.

20. One or more computer-readable storage media that are not a transitory, propagating signal storing computer-executable instructions for controlling a device to generate an authentication code for a message, the instructions comprising:
instructions that generate an encrypted message using a key as a concatenation of an initialization vector, an encrypted nonce part, and an encrypted message part, the encrypted message being encrypted with a block cipher;
instructions that generate an authentication code by generating a dividend by adding the message and a nonce and setting the authentication code to the dividend modulo a divisor that is a power of two;
instructions that send to another device the generated encrypted message and the generated authentication code so that the other device can decrypt the generated encrypted message using the key to generate a decrypted message and a decrypted nonce and regenerate the authentication code using the decrypted message, the decrypted nonce, and the divisor to verify integrity and authenticity of the decrypted message; and
instructions that verify the integrity and authenticity of an encrypted message.

21. The one or more computer-readable storage media of claim 20 wherein the block cipher is based on cipher-block chaining.

22. The one or more computer-readable storage media of claim 20 wherein the instructions that verify the integrity and authenticity of the encrypted message decrypt the generated encrypted message using the key to generate a decrypted message and a decrypted nonce and regenerate the authentication code using the decrypted message, the decrypted nonce, and the divisor.

23. One or more computer-readable storage media that are not a transitory, propagating signal storing computer-executable instructions for controlling a device to verify the integrity and authenticity of an encrypted message, the instructions comprising:
instructions that receive the encrypted message and an authentication code;
instructions that decrypt the received encrypted message with an encryption key;
instructions that extract a message and an nonce from the decrypted message;

instructions that generates an authentication code based on an authentication combination of the extracted message and the extracted nonce modulo a divisor; and instructions that, when the generated authentication code matches the received authentication code, verifies the integrity and authenticity of the extracted message.

24. The one or more computer-readable storage media of claim 23 wherein the encrypted messages is an encryption of a concatenation of the message and the nonce.

25. The one or more computer-readable storage media of claim 24 wherein the authentication combination of the message and the nonce is an addition of the nonce to the message multiplied by an authentication key.

26. The one or more computer-readable storage media of claim 23 wherein the divisor is a prime number.

27. The one or more computer-readable storage media of claim 23 wherein the authentication combination is a sum of the message and the nonce modulo a power of two.

* * * * *